United States Patent
Okamatsu et al.

(10) Patent No.: US 8,513,331 B2
(45) Date of Patent: Aug. 20, 2013

(54) PUNCTURE REPAIR MATERIAL RECOVERY SYSTEM

(75) Inventors: Takahiro Okamatsu, Hiratsuka (JP); Kazushi Kimura, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 140 days.

(21) Appl. No.: 12/891,254

(22) Filed: Sep. 27, 2010

(65) Prior Publication Data
US 2011/0077327 A1    Mar. 31, 2011

(30) Foreign Application Priority Data
Sep. 30, 2009  (JP) .................... 2009-226526

(51) Int. Cl.
B60C 19/00    (2006.01)
(52) U.S. Cl.
USPC .............................. 523/157; 523/155; 156/97
(58) Field of Classification Search
USPC ................... 548/335.1, 341.1; 525/281, 375, 525/381
See application file for complete search history.

(56) References Cited

U.S. PATENT DOCUMENTS

| | | | |
|---|---|---|---|
| 4,910,263 A * | 3/1990 | Brois et al. ............... | 525/331.7 |
| 6,992,119 B2 | 1/2006 | Kojima et al. | |
| 7,037,396 B2 | 5/2006 | Naito et al. | |
| 7,745,511 B2 | 6/2010 | Okamatsu et al. | |
| 2003/0175615 A1 * | 9/2003 | Miyake et al. ............. | 430/270.1 |

FOREIGN PATENT DOCUMENTS

| | | |
|---|---|---|
| JP | 2004-035867 | 2/2004 |
| JP | 2006-111726 | 4/2006 |
| JP | 111726 | 4/2006 |
| JP | 3854841 | 9/2006 |
| JP | 4245654 | 1/2009 |

\* cited by examiner

*Primary Examiner* — Nicole M Buie-Hatcher
*Assistant Examiner* — Chelsea M Lowe
(74) *Attorney, Agent, or Firm* — Thorpe North & Western LLP

(57) ABSTRACT

A gelling agent, and a method of use for the same, for gelling a puncture repair material, the puncture repair material including a natural rubber latex, a resin emulsion, and an antifreezing agent, the gelling agent comprising a compound ($\alpha$) of the following Formula (1). In the following Formula 1, $R^1$ is an alkyl group having from 13 to 30 carbon atoms or an alkenyl group having from 13 to 30 carbon atoms.

(1)

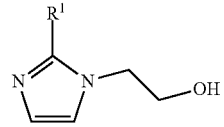

19 Claims, 3 Drawing Sheets

| | | | Examples | | | | Comparative examples | | | | | | | | | | |
|---|---|---|---|---|---|---|---|---|---|---|---|---|---|---|---|---|---|
| | | | 1 | 2 | 3 | 4 | 1 | 2 | 3 | 4 | 5 | 6 | 7 | 8 | 9 | 10 | 11 |
| Puncture repair material gelling agent | Compound 1 | | 10 | | | | | | | | | | | | | | |
| | Compound 2 | | | 10 | | 10 | | | | | | | | | | | |
| | Compound 3 | | | | 10 | | | | | | | | | | | | |
| | Compound 4 | | | | | | 10 | | | | | | | 10 | | | |
| | Compound 5 | | | | | | | 10 | | | | | | | | | |
| | Compound 6 | | | | | | | | 10 | | | | | | 10 | | |
| | Compound 7 | | | | | | | | | 10 | | | | | | 10 | |
| | Compound 8 | | | | | | | | | | 10 | | | | | | 10 |
| | Compound 9 | | | | | | | | | | | 10 | | | | | | 10 |
| Added amount of puncture repair material gelling agent | | | 10 | 10 | 10 | 10 | 10 | 10 | 10 | 10 | 10 | 10 | 10 | 10 | 10 | 10 | 10 |
| Puncture repair material 1 | | | 100 | 100 | 100 | | 100 | 100 | 100 | 100 | 100 | 100 | | | | | |
| Puncture repair material 2 | | | | | | 100 | | | | | | | 100 | 100 | 100 | 100 | 100 |
| Room temperature test (at 20°C) | Inject-ability | Evalua-tion | O | O | O | O | × | × | × | O | O | △ | × | × | O | O | △ |
| | Gelability | Time (min.) | 8 | 7 | 8 | 5 | 15 | 15 | 60+ | 60+ | 60+ | 25 | 15 | 60+ | 60+ | 60+ | 20 |
| | | Evalua-tion | O | O | O | O | × | × | × | × | × | × | × | × | × | × | × |

|  |  | Examples | | | | Comparative examples | | | | | | | | | | |
|---|---|---|---|---|---|---|---|---|---|---|---|---|---|---|---|---|
|  |  | 1 | 2 | 3 | 4 | 1 | 2 | 3 | 4 | 5 | 6 | 7 | 8 | 9 | 10 | 11 |
| Puncture repair material gelling agent | Compound 1 | 10 |  |  |  |  |  |  |  |  |  |  |  |  |  |  |
|  | Compound 2 |  | 10 |  |  |  |  |  |  |  |  |  |  |  |  |  |
|  | Compound 3 |  |  | 10 |  |  |  |  |  |  |  |  |  |  |  |  |
|  | Compound 4 |  |  |  | 10 |  |  |  |  |  |  |  |  |  |  |  |
|  | Compound 5 |  |  |  |  | 10 | 10 |  |  |  |  |  |  |  |  |  |
|  | Compound 6 |  |  |  |  |  |  | 10 |  |  |  |  |  |  |  |  |
|  | Compound 7 |  |  |  |  |  |  |  | 10 |  |  | 10 |  |  |  |  |
|  | Compound 8 |  |  |  |  |  |  |  |  | 10 | 10 |  | 10 |  |  |  |
|  | Compound 9 |  |  |  |  |  |  |  |  |  |  |  |  | 10 | 10 | 10 |
| Added amount of puncture repair material gelling agent | | 10 | 10 | 10 | 10 | 10 | 10 | 10 | 10 | 10 | 10 | 10 | 10 | 10 | 10 | 10 |
| Puncture repair material 1 | | 100 | 100 | 100 |  | 100 | 100 | 100 | 100 | 100 | 100 | 100 | 100 | 100 | 100 | 100 |
| Puncture repair material 2 | | | | | 100 | | | | | | | | | | | |
| Room temperature test (at 20°C) | Inject-ability Evaluation | ○ | ○ | ○ | ○ | × | × | × | ○ | ○ | △ | × | × | ○ | ○ | △ |
|  | Time (min.) | 8 | 7 | 8 | 5 | 15 | 15 | 60+ | 60+ | 60+ | 25 | 15 | 60+ | 60+ | 60+ | 20 |
|  | Gelability Evaluation | ○ | ○ | ○ | ○ | × | × | × | × | × | × | × | × | × | × | × |

FIG. 2

|  |  | Examples |  |  |  |  |  |  | Comparative examples |  |  |  |
|---|---|---|---|---|---|---|---|---|---|---|---|---|
|  |  | 5 | 6 | 7 | 8 | 9 | 10 | 11 | 12 | 13 | 14 | 15 |
| Puncture repair material gelling agent | Compound 1 | 10 |  |  |  |  |  |  |  |  |  |  |
|  | Compound 2 |  | 10 |  |  |  |  |  |  |  |  |  |
|  | Compound 3 |  |  | 10 |  |  |  |  |  |  |  |  |
|  | Compound 4 |  |  |  | 10 |  |  |  |  |  |  |  |
|  | Compound 5 |  |  |  |  | 10 |  |  |  |  |  |  |
|  | Compound 6 |  |  |  |  |  | 10 | 10 |  |  |  |  |
|  | Compound 7 |  |  |  |  |  |  |  | 10 |  |  |  |
|  | Compound 8 |  |  |  |  |  |  |  |  | 10 |  |  |
|  | Compound 9 |  |  |  |  |  |  |  |  |  | 10 | 10 |
|  | Antifreezing agent 1 | 5 | 5 | 3 | 5 | 3 | 2 | 6 | 5 | 5 | 5 | 6 |
|  | Antifreezing agent 2 |  |  | 2 |  |  |  |  |  |  |  |  |
| Added amount of puncture repair material gelling agent |  | 15 | 15 | 15 | 15 | 13 | 12 | 16 | 15 | 15 | 15 | 16 |
| Puncture repair material 1 |  | 100 | 100 | 100 |  | 100 | 100 | 100 | 100 | 100 | 100 | 100 |
| Puncture repair material 2 |  |  |  |  | 100 |  |  |  |  |  |  |  |
| Room temperature test (at 20°C) | Injectability Evaluation | ○ | ○ | ○ | ○ | ○ | ○ | ○ | × | ○ | ○ | △ |
|  | Gelability Time (min.) | 10 | 10 | 9 | 10 | 9 | 9 | 8 | 60+ | 60+ | 60+ | 20 |
|  | Evaluation | ○ | ○ | ○ | ○ | ○ | ○ | ○ | × | × | × | × |
| Low temperature test (at −20°C) | Injectability Evaluation | ○ | ○ | ○ | ○ | ○ | × | ○ | ○ | ○ | ○ | ○ |
|  | Gelability Time (min.) | 15 | 17 | 14 | 13 | 12 | 15 | 22 | 60+ | 60+ | 60+ | 25 |
|  | Evaluation | ○ | ○ | ○ | ○ | ○ | ○ | × | × | × | × | × |

FIG. 3

PUNCTURE REPAIR MATERIAL RECOVERY SYSTEM

PRIORITY CLAIM

This application is based upon and claims the benefit of priority from Japanese Patent Application No. 2009-226526, filed Sep. 30, 2009, the entire content of which is incorporated herein by reference.

BACKGROUND

1. Technical Field

The present disclosure relates to a puncture repair material gelling agent and a method of use for the same.

2. Related Art

Japanese Unexamined Patent Application Publication No. 2004-35867A describes a puncture repair material containing at least a natural rubber latex, a tackifying resin emulsion, and an antifreezing agent, wherein a solid content (A) of the natural rubber latex is from 30 to 60 parts by weight, a solid content (B) of the tackifying resin emulsion is from 10 to 30 parts by weight and a content (C) of the antifreezing agent is from 20 to 50 parts by weight per 100 parts by weight of a total solid contents that is a sum (A+B+C) of the solid content (A) of the natural rubber latex, the solid content (B) of the tackifying resin emulsion and the content (C) of the anti-freezing agent; an aromatic modified terpene resin is used as a tackifying resin in the tackifying resin emulsion, and the puncture repair material can maintain high, stable sealing performance over a long period of time even when stored under harsh temperature conditions for a long period of time.

Japanese Unexamined Patent Application Publication No. 2006-111726A describes a puncture repair material for sealing holes in a punctured tire wherein the puncture repair material seals puncture holes quickly and has long term stability; and includes a natural rubber latex and an antifreeze liquid, and furthermore includes a resin-based emulsion that uses a nonionic surfactant as an emulsifying agent, and at least one selected from the group consisting of a modified phenolic resin, a petroleum resin, and a carboxylic acid modified terpene resin as a resin component.

As described above, puncture repair materials including natural rubber lattices, resin emulsions, and antifreezing agents have been conventionally proposed as puncture repair materials for repairing punctured tires.

Puncture repair materials like those described above are typically introduced into a tire from an air filling part of the tire. After the tire is filled with air to a desired air pressure, the puncture repair material reaches the puncture holes via the running of the vehicle. Moreover, aggregates of rubber particles in the puncture repair material form due to compressive forces and shear forces exerted on the tire as it contacts the ground and rotates, thereby enabling sealing of the puncture holes and making it possible for the vehicle to run.

However, excesses of the puncture repair material that are introduced into the tire do not aggregate and instead remain as a liquid in the tire. It is quite difficult to recover such excesses of the puncture repair material without removing the tire from the wheel. Therefore, tires must be removed from wheels in order to recover the puncture repair material. However, because puncture repair materials generally include an antifreezing agent, such as ethylene glycol, legal disposal following removal from a rim is problematic.

In order to solve these problems, the present inventors invented an emulsion coagulant, which enables the simple recovery of puncture repair material from tires and the disposal of the recovered material. The coagulant can coagulate a puncture repair material containing emulsion particles, including a gelling agent and a mineral that induces aggregation of the emulsion particles, by weakening a surface charge of the emulsion particles and/or hydrogen bonding with the emulsion particles. As a result, an emulsion coagulant is provided that makes possible the simple recovery of puncture repair material from tires and the disposal of the recovered material (see Japanese Patent No. 4245654).

A recovery method for the puncture repair material using the emulsion coagulant described in Japanese Patent No. 4245654 includes the steps of adding the emulsion coagulant to the puncture repair material in the tire, coagulating the puncture repair material using the emulsion coagulant to form a coagulation product, and recovering the coagulation product from the tire.

However, the emulsion coagulant described in Japanese Patent No. 4245654 is a powder. Therefore, there is a limitation that in order to mix the emulsion coagulant with the puncture repair material that remains in the tire the tire has to be removed from the wheel. Additionally, when removing the tire from the wheel there are working condition problems, such as that the puncture repair material in the tire may spill out and stick to the tire changer.

On the other hand, Japanese Patent No. 3854841 describes a method for treating puncture repair material, which includes a pneumatic tire assembled on a rim that has undergone puncture repair by having a liquid puncture repair material including a latex introduced into the tire. A polymer coagulate (polyethyleneimine) is prepared as an aqueous solution of 20 to 30 mass %, and the aqueous solution is introduced to the polymer coagulate in a proportion of from 0.5 to 3.0 mass % to cause the polymer coagulate to coagulate and adhere to an inner wall of the tire. As the polymer coagulate is introduced to the liquid puncture repair material that is sealed in the pneumatic tire that has undergone puncture repair, thereby causing the puncture repair material to coagulate and adhere to the inner wall of the tire, the puncture repair material will not drip out when the pneumatic tire is removed from the wheel and soiling of the surroundings can be prevented.

An object of the present disclosure is to provide a puncture repair material gelling agent that is a liquid, can be introduced into a tire through a tire air injection inlet (hereinafter referred to as a "tubeless valve" or "valve") and can quickly gel a puncture repair material that includes a natural rubber latex, a resin emulsion, and an antifreezing agent, and a method of use for the same.

SUMMARY

As a result of diligent research, the present inventors learned that by mixing a compound (α) of the following Formula (1) with a puncture repair material (D) that includes a natural rubber latex (A), a resin emulsion (B), and an antifreezing agent (C), the puncture repair material (D) can be quickly gelled; and, moreover, a puncture repair material gelling agent including the compound (α) has injectability that allows it to be injected via a valve into a cavity of a tire that is assembled on a rim.

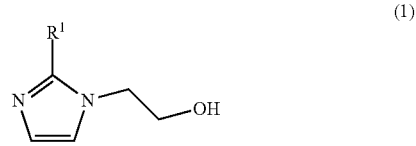

(1)

In Formula (1), $R^1$ is an alkyl group having from 13 to 30 carbon atoms or an alkenyl group having from 13 to 30 carbon atoms.

As a result of further diligent research, the present inventors learned that the puncture repair material gelling agent has injectability and gelability properties even at −20° C. when 3 to 5 parts by mass of an antifreezing agent (β) per 10 parts by mass of the compound (α) are included.

Specifically, the present technology includes the following:

1. A puncture repair material gelling agent for gelling a puncture repair material (D) that includes a natural rubber latex (A), a resin emulsion (B), and an antifreezing agent (C), including a compound (α) of Formula (1):

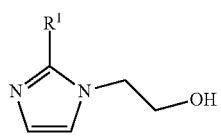

(1)

In Formula (1), $R^1$ is an alkyl group having from 13 to 30 carbon atoms or an alkenyl group having from 13 to 30 carbon atoms.

2. The puncture repair material gelling agent according to 1, including 50 mass % or more of the compound (α).

3. The puncture repair material gelling agent according to 1 or 2, further including from 3 to 5 parts by mass of an antifreezing agent (β) per 10 parts by mass of the compound (α)

4. The puncture repair material gelling agent according to 3, wherein the antifreezing agent (β) is at least one type selected from the group consisting of propylene glycol, di(ethylene glycol), and glycerin.

5. The puncture repair material gelling agent according to any of 1 to 4, wherein the puncture repair material gelling agent is a liquid at 20° C. and gels the puncture repair material (D) at 20° C. within 10 minutes.

6. The puncture repair material gelling agent according to any of 1 to 5, wherein the puncture repair material gelling agent is a liquid at −20° C. and gels the puncture repair material (D) at −20° C. within 20 minutes.

7. The puncture repair material gelling agent according to any of 1 to 6, wherein the resin emulsion (B) includes an ethylene-vinyl acetate copolymer resin emulsion and/or an acrylic emulsion.

8. The puncture repair material gelling agent according to any of 1 to 7, wherein the antifreezing agent (C) includes at least one type selected from the group consisting of propylene glycol, (di-)ethylene glycol, and glycerin.

9. The puncture repair material gelling agent according to any of 1 to 8, wherein a solid content of the natural rubber latex (A) is 30 mass % or more of a total of a rubber solid content and a resin solid content of the puncture repair material (D).

10. A puncture repair kit including: a puncture repair material (D) that includes a natural rubber latex (A), a resin emulsion (B), and an antifreezing agent (C), wherein a solid content of the natural rubber latex (A) is 30 mass % or more of a total of a rubber solid content and a resin solid content of the puncture repair material (D); and a puncture repair material gelling agent according to any of 1 to 9.

11. A method of use for the puncture repair material gelling agent according to any of 1 to 9 including: introducing a puncture repair material gelling agent according to any of 1 to 9 into a pneumatic tire assembled on a rim that has undergone puncture repair by having a puncture repair material (D) that includes a natural rubber latex (A), a resin emulsion (B), and an antifreezing agent (C), wherein a solid content of the natural rubber latex (A) is 30 mass % or more of a total of a rubber solid content and a resin solid content of the puncture repair material (D) introduced into the tire; mixing the puncture repair material (D) and the puncture repair material gelling agent; and gelling the puncture repair material.

12. A method for recovering puncture repair material remaining in a tire including: introducing a puncture repair material gelling agent according to any of 1 to 9 into a pneumatic tire assembled on a rim that has undergone puncture repair by having a puncture repair material (D) that includes a natural rubber latex (A), a resin emulsion (B), and an antifreezing agent (C), wherein a solid content of the natural rubber latex (A) is 30 mass % or more of a total of a rubber solid content and a resin solid content of the puncture repair material (D) introduced into the tire; mixing the puncture repair material (D) and the puncture repair material gelling agent; gelling the puncture repair material; and recovering the gelled puncture repair material.

13. A method for using a compound of Formula (1) as a puncture repair material gelling agent including a natural rubber latex, a resin emulsion, and an antifreezing agent.

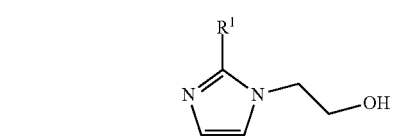

(1)

In Formula (1), $R^1$ is an alkyl group having from 13 to 30 carbon atoms or an alkenyl group having from 13 to 30 carbon atoms.

An object of the present disclosure is to provide a puncture repair material gelling agent that is a liquid, can be introduced into a tire through a tire air injection inlet (hereinafter referred to as, "tubeless valve" or "valve") and can quickly gel a puncture repair material that includes a natural rubber latex, a resin emulsion, and an antifreezing agent, and a method of use for the same.

BRIEF DESCRIPTION OF THE DRAWINGS

FIGS. 2-3 are tables of results of room temperature tests and low temperature tests in accordance with examples.

DETAILED DESCRIPTION

Figure 1:
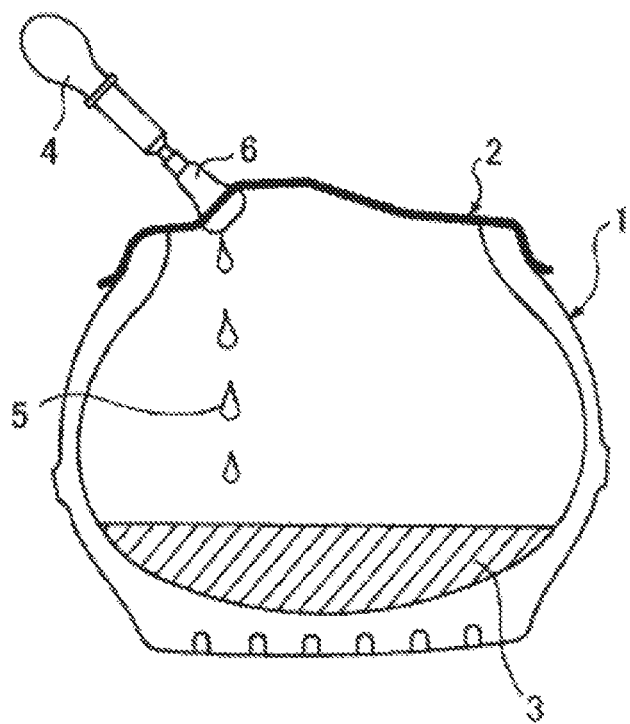
FIG. 1 is an explanatory diagram showing an introduction method of the puncture repair material gelling agent of the present disclosure.

The present disclosure is explained in further detail below.
Puncture Repair Material Gelling Agent The puncture repair material gelling agent of the present disclosure (hereinafter, simply the "gelling agent of the present disclosure"), includes a compound (α), and, optionally, an antifreezing agent (β).
Compound (α)

The gelling agent of the present disclosure is not particularly limited as long as it includes the compound (α), but preferably contains 50 mass % or more of the compound (α) and may be formed substantially from the compound (α).

The compound (α) is a compound of the following Formula (1) that can be used as a puncture repair material gelling agent for gelling a puncture repair material that includes a natural rubber latex (A), a resin emulsion (B), and an antifreezing agent (C) (described below).

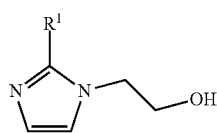
(1)

In Formula (1), $R^1$ is an alkyl group having from 13 to 30 carbon atoms or an alkenyl group having from 13 to 30 carbon atoms.

$R^1$ is not particularly limited as long as it is an alkyl group having from 13 to 30 carbon atoms or an alkenyl group having from 13 to 30 carbon atoms, but for example, an alkyl group represented by the following Formula (2), or an alkenyl group represented by the following Formulas (5) or (6) are preferable.

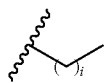
(2)

In Formula (2), i is a whole number that satisfies the relationship $13 \leq i+1 \leq 30$.

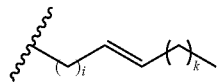
(3)

In Formula (3), j and k are zero (0) or positive integers that satisfy the relationship $13 \leq j+k+3 \leq 30$.

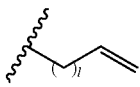
(4)

In Formula (4), l is a whole number that satisfies the relationship $13 \leq l+2 \leq 30$.

The compound (α) can be synthesized according to known conventional methods, for example, by a method for synthesizing imidazoline surfactants.

Additionally, a commercially available product can be purchased and used. Specific examples of the commercially available products that can be used as the compound (α) include Homogenol L-95 (manufactured by Kao Corporation) ($R^1$=palmitoleyl group; j=8, k=5).

Antifreezing Agent (β)

The gelling agent of the present disclosure may further include from 3 to 5 parts by mass of the antifreezing agent (β) per 10 parts by mass of the compound (α). When the antifreezing agent (β) is included in this range, injectability of the gelling agent of the present disclosure will not be hindered even at −20° C., and the antifreezing agent (β) will have gelability that can gel the puncture repair material (D) quickly, more specifically, within 20 minutes.

The antifreezing agent (β) is not particularly limited as long as it is a compound that can prevent water from freezing, but specific examples include ethylene glycol, propylene glycol, glycerin (glycerol), and the like. Additionally, a single antifreezing agent may be used alone or a combination of two or more antifreezing agents may be used.

Other Ingredients that May be Included

The gelling agent of the present disclosure, in addition to the compound (α) and the antifreezing agent (β), may include as desired or necessary, up to 50 mass % of additives such as, for example, solvents, fillers, antiaging agents, antioxidants, pigments (dyes), plasticizers, thixotropic agents, UV absorbents, flame retardants, surfactants, (including leveling agents), dispersants, dehydrating agents, antistatic agents, and the like.

The solvent is not particularly limited, but is preferably an aqueous solvent and is particularly preferably water.

The filler can be an organic or inorganic filler of any form. Specific examples include, for example, fumed silica, calcined silica, precipitated silica, pulverized silica, molten silica; diatomaceous earth; iron oxide, zinc oxide, titanium oxide, barium oxide, magnesium oxide; calcium carbonate, magnesium carbonate, zinc carbonate; pyrophyllite clay, kaolin clay, calcined clay; carbon black; fatty acid treated products, resin acid treated products, urethane compound treated products, and fatty acid ester treated products thereof; and the like.

Specific examples of the antiaging agents include compounds such as a hindered phenol compound and the like.

Specific examples of the antioxidants include butylhydroxytoluene (BHT), butylhydroxyanisole (BHA), and the like.

Specific examples of the pigment include inorganic pigments such as titanium oxide, zinc oxide, ultramarine, iron red, lithopone, lead, cadmium, iron, cobalt, aluminum, hydrochlorides, sulfates, and the like; organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, carbon black, and the like; and the like.

Specific examples of the plasticizer include diisononyl phthalate (DINP); dioctyl adipate and indecyl succinate; di(ethylene glycol) dibenzoate and pentaerythritol esters; butyl oleate and methyl acetyl ricinoleate; tricresyl phosphate and trioctyl phosphate, propylene glycol adipate polyesters and butylene glycol adipate polyesters; and the like.

Specific examples of the thixotropic agent include Aerosil (manufactured by Nippon Aerosil), Disparlon (manufactured by Kusumoto Chemicals, Ltd.), and the like.

Specific examples of the flame retardant include chloroalkyl phosphates, dimethyl phosphates, methyl phosphates, bromine or phosphorus compounds, ammonium polyphosphates, neopentyl bromide polyethers, brominated polyethers, and the like.

Specific examples of the antistatic agent include quaternary ammonium salts; hydrophilic compounds such as polyglycols, ethylene oxide derivatives, and the like; and the like.

The gelling agent of the present disclosure quickly gels the puncture repair material, and preferably gels the puncture repair material within 10 minutes at 20° C. Additionally, when the antifreezing agent (β) is included, it preferably gels the puncture repair material within 20 minutes at −20° C.

Additionally, the gelling agent of the present disclosure is preferably a liquid in a temperature range of from −20° C. to 80° C.

Manufacturing Method

The manufacturing method of the gelling agent of the present disclosure is not particularly limited. For example, it may be manufactured using only the compound (α), or may be manufactured by uniformly mixing the compound (α), and, as desired, the antifreezing agent (β), and furthermore, the other ingredients that may be included.

Puncture Repair Material (D)

The puncture repair material (D) to be gelled by the gelling agent of the present disclosure is not particularly limited as long as it is a puncture repair material including the natural rubber latex (A), the resin emulsion (B), and the antifreezing agent (C), but is preferably a puncture repair material in which a solid content of the natural rubber latex (A) is 30 mass % or more of a total mass of a solid content of a rubber component and a resin component in the puncture repair material (D).

Natural Rubber Latex (A)

The natural rubber latex (A) is not particularly limited, and a rubber latex obtained by tapping the Hevea brasiliensis tree may be used.

Natural rubber lattices from which proteins have been removed (known as "deproteinized natural rubber latex") are preferred as the natural rubber latex (A). If a protein content of the natural rubber latex (A) is low, it is possible to reduce an amount of ammonia produced, which is desirable from the perspectives of preventing corrosion damage of steel cords by ammonia and preventing the generation of irritating odors.

Specific examples of the natural rubber latex that can be used include Deproteinized Natural Rubber Latex (SeLatex series, manufactured by SRI Hybrid Ltd.), Deproteinized Natural Rubber Latex (Hytex HA, manufactured by Nomura Trading Co., Ltd.), Ultra-low Ammonia Natural Rubber Latex (ULACOL, manufactured by Regitex Co., Ltd.), and the like.

Resin Emulsion (B)

The resin emulsion (B) is not particularly limited, but tackifying resin emulsions, ethylene-vinyl acetate copolymer resin emulsions, acrylic emulsions, polyolefin emulsions, polyethylene emulsions, and the like can be used singly or in any combinations thereof.

The tackifying resin emulsion is not particularly limited as long as it is a tackifier, but preferably an emulsified aromatic modified terpene resin is used. This aromatic modified terpene resin is, as is well-known in the art, a product of cationic polymerizing a terpene compound and an aromatic compound in the presence of a Friedel-Crafts catalyst. Additionally, the tackifying resin emulsion may also be an aromatic modified hydrogenated terpene resin obtained by hydrogenating the obtained aromatic modified terpene resin.

The ethylene-vinyl acetate copolymer resin emulsion is not particularly limited as long as it is a copolymer resin emulsion that contains ethylene and vinyl acetate as a monomer unit, but preferably is, for example, a copolymer resin emulsion of ethylene and vinyl acetate, a copolymer resin emulsion of ethylene, vinyl acetate, and vinyl propionate ester, or the like.

Specific examples of commercially available ethylene-vinyl acetate copolymer resin emulsions that can be used include Sumikaflex 400HQ, 408HQE, 950HQ, and 951HQ (all manufactured by Sumika Chemtex Co., Ltd.).

The acrylic emulsion is not particularly limited, and conventionally known acrylic emulsions can be favorably used such as, for example, aqueous emulsions obtained by polymerizing a methacrylate ester, an acrylic ester, aromatic vinyl monomers, unsaturated nitrile, conjugate diolefin, multifunctional vinyl monomers, amide monomers, hydroxy group-containing monomers, caprolactone-added monomers, amino group-containing monomers, glycidyl group-containing monomers, acidic monomers, vinyl monomers, and the like using an emulsification dispersant (emulsion polymerization).

Specific examples of the methacrylate ester include, for example, methyl methacrylate, ethyl methacrylate, butyl methacrylate, hexyl methacrylate, cyclohexyl methacrylate, nonyl methacrylate, lauryl methacrylate, and the like.

Specific examples of the acrylic ester include butyl acrylate, hexyl acrylate, 2-ethylhexyl acrylate, and the like.

The polyolefin emulsion is not particularly limited and conventionally known polyolefin emulsions can be used such as, for example, a polyolefin having hydrophilic groups introduced that is dispersed in water, and the like. Examples of the hydrophilic groups include carboxy groups, sulfonic acid groups, phosphate groups, hydroxy groups, amino groups, and the like.

Specific examples of the polyolefin emulsion preferably include polyethylene emulsions, polypropylene emulsions, ethylene-propylene copolymer emulsions, and polybutene emulsions.

One of these may be used alone, or two or more may be used in any combination.

The polyethylene emulsion is not particularly limited, and conventionally known polyethylene emulsions can be used.

Examples of the polyethylene emulsion include a polyethylene having hydrophilic groups introduced that is dispersed in water, and the like. Examples of the hydrophilic groups include carboxy groups, sulfonic acid groups, phosphate groups, hydroxy groups, amino groups, and the like.

Antifreezing Agent (C)

The antifreezing agent (C) is not particularly limited as long as it is a compound that can prevent water from freezing, but specific examples include ethylene glycol, propylene glycol, glycerin (glycerol), and the like.

A single antifreezing agent may be used alone or a combination of two or more antifreezing agents may be used.

Puncture Repair Kit

A puncture repair kit may be constituted by including the puncture repair material and the gelling agent of the present disclosure as a set.

The puncture repair kit must include the puncture repair material and the gelling agent of the present disclosure as essential components, and additionally may include, for example, a compressor or the like as an optional component.

Method of Use for the Puncture Repair Material Gelling Agent

A method of use for the gelling agent of the present disclosure will be described in detail while referring to FIG. 1.

In FIG. 1, 1 is a punctured pneumatic tire and is assembled on a rim 2. A liquid puncture repair material 3 that includes a natural rubber latex, a resin emulsion, and an antifreezing agent has been introduced via a valve 6 to the pneumatic tire 1 as an emergency puncture treatment.

The pneumatic tire 1 that has had punctures repaired as described above must be removed from the rim 2 (wheel) at a repair facility, and the puncture repair material 3 inside the tire must be removed before disposing of the tire.

A method of use for the gelling agent of the present disclosure is as follows: while the pneumatic tire 1 that has had punctures repaired is assembled on the rim 2, the puncture repair material gelling agent 5 is drip-introduced into the pneumatic tire 1 via the valve 6 using an injector 4 filled with the puncture repair material gelling agent 5. After dripping, when the pneumatic tire 1 is rotated a number of times, the puncture repair material gelling agent 5 and the puncture repair material 3 mix and the puncture repair material 3 gels.

Thus, because the puncture repair material gels, when the pneumatic tire 1 is removed from the rim 2, the puncture repair material will not spill out and soil the surroundings.

Method for Recovering Puncture Repair Material Remaining in The Tire

A method of recovering puncture repair material remaining in a tire in which the gelling agent of the present disclosure was used will be described in detail while referring to FIG. 1.

In FIG. 1, 1 is a punctured pneumatic tire and is assembled on a rim 2. A liquid puncture repair material 3 that includes a natural rubber latex, a resin emulsion, and an antifreezing agent has been introduced via a valve 6 to the pneumatic tire 1 as an emergency puncture treatment.

The pneumatic tire 1 that has had punctures repaired as described above must be removed from the rim 2 (wheel) at a repair facility and the puncture repair material 3 inside the tire must be removed before disposing of the tire.

A method of use for the gelling agent of the present disclosure is as follows: while the pneumatic tire 1 that has had punctures repaired is assembled on the rim 2, the puncture repair material gelling agent 5 is drip-introduced into the pneumatic tire 1 via the valve 6 using an injector 4 filled with the puncture repair material gelling agent 5. After dripping, when the pneumatic tire 1 is rotated a number of times, the puncture repair material gelling agent 5 and the puncture repair material 3 mix and the puncture repair material 3 gels.

After the puncture repair material 3 has gelled, the pneumatic tire 1 is removed from the rim 2. At this time, puncture repair material 3 is gelled so it will not spill out and soil the surroundings.

The puncture repair material 3 is gelled inside the tire and is recovered after the pneumatic tire 1 has been removed from the rim 2. During recovery, the emulsion coagulant described in Japanese Patent No. 4245654 may be sprinkled thereon so as to induce further coagulation (hardening).

EXAMPLES

1. Puncture Repair Material

Puncture repair materials 1 and 2 were prepared according to the compositions shown in Table 1. Note that the compounded amounts shown in Table 1 are expressed in terms of liquid mass (g).

TABLE 1

| | Puncture repair material | |
| --- | --- | --- |
| | 1 | 2 |
| Natural rubber latex | 24 | 24 |
| Resin emulsion 1 | 26 | |
| Resin emulsion 2 | | 26 |
| Antifreezing agent 1 | 50 | |
| Antifreezing agent 2 | | 50 |
| Total | 100 | 100 |

The ingredients shown in Table 1 are as follows.

Natural rubber latex: Hytex HA (manufactured by Nomura Trading Co., Ltd.; Solid content=approximately 60 mass %)

Resin emulsion 1: Sumikaflex 950HQ (manufactured by Sumika Chemtex Co., Ltd.; ethylene-vinyl acetate-vinyl propionate ester copolymer resin emulsion; solid content=approximately 53 mass %)

Resin emulsion 2: E8559 (manufactured by Asahi Kasei Chemicals Corporation; methyl methacrylate resin emulsion; solid content approximately 55 mass %)

Antifreezing agent 1: Propylene glycol (manufactured by Adeka Corporation)

Antifreezing agent 2: Glycerin (manufactured by Wako Pure Chemical Industries, Ltd.)

2. Puncture Repair Material Gelling Agent

A compound as represented by the following Formula (5) was synthesized.

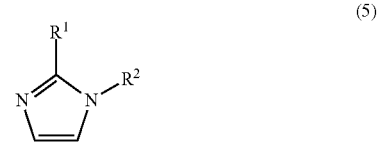

(5)

In Formula (5), $R^1$ is the alkenyl group shown below in Formula (6).

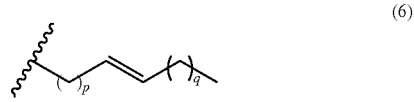

(6)

In Formula (6), p and q are zero (0) or positive integers. Also, n=p+q+3 represents a number of carbon atoms in $R^1$.

Additionally, in Formula (5) $R^2$ is a hydroxyethyl group (2-hydroxyethyl group; see the following Formula (7)) or an ethyl group.

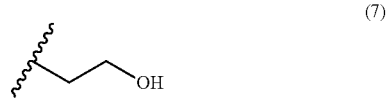 [SMILES: *CCO]

(7)

In the present example, when "types" of $R^2$ are mentioned, hydroxyethyl groups (also described as "hEt") or ethyl groups (also described as "Et") are being referred to.

Compounds 1 to 9 were prepared having combinations of numbers of carbon atoms of $R^1$ and types of $R^2$ as shown in Table 2.

TABLE 2

| | | Compound | | | | | | | | |
| --- | --- | --- | --- | --- | --- | --- | --- | --- | --- | --- |
| | | 1 | 2 | 3 | 4 | 5 | 6 | 7 | 8 | 9 |
| $R^1$ | No. of C atoms | 16 | 23 | 30 | 9 | 11 | 11 | 23 | 30 | 33 |
| $R^2$ | Type | hEt | hEt | hEt | hEt | hEt | Et | Et | Et | Et |

The compound represented by the formula (5) can be synthesized according to known synthesis methods.

An example of a synthesis method for the compound 5 is given below.

After 200 g (1 mol) of lauric acid and 109.2 g of aminoesterethanolamine (hereinafter abbreviated "AEEA") were put into a four neck flask, 80° C. hot water was passed through a reflux condenser and mixed in, and then the mixture was heated to 140° C.

Then, a reaction pressure was set to 400 mmHg over the course of one hour, and the mixture was reacted for two hours to perform amidation.

Furthermore, after that, $N_2$ was returned to ambient pressure, and 3.0 g (0.025 mol) of $NaH_2PO_4$ was added.

Next, a reaction temperature was set to 200° C. and the pressure was lowered to 200 mmHg over the course of 1.5 hours. The mixture was left under these conditions for one hour.

After that, the pressure was lowered to 10 mmHg over an additional 1.5 hours. The mixture was reacted under these conditions for one hour and excess AEEA was removed. During this time produced water and steam of the AEEA was collected in a dry ice/methanol cooling trap.

Composition analysis of the reacted product was performed using high performance liquid chromatography and the reacted product was confirmed to be the target compound 5.

3. Injectability and Gelability Tests

Tests were performed on the ease of introduction of each gelling agent via a valve (injectability) and the time necessary to gel (gelability).

Room Temperature Test (at 20° C.)

Injectability and gelability tests were performed for Examples 1 to 11 and Comparative examples 1 to 15 in a 20° C. environment, and evaluations were conducted.

Injectability was evaluated according to the following scale.

◯: Introduction via the valve into the tire using the injector was easy;

Δ: Introduction was difficult;

x: Introduction was not possible.

For gelability, a time (in minutes) required for gelling to occur when 100 g of the puncture repair material were added to a predetermined amount of the gelling agent was measured and evaluated according to the following scale.

◯: Took 10 minutes or less to gel/Excellent gelability;

x: Took more than 10 minutes to gel/Insufficient gelability.

Low Temperature Test (at −20° C.)

Injectability and gelability tests were performed for Examples 5 to 11 and Comparative examples 12 to 15 in a −20° C. environment, and evaluations were conducted.

Injectability testing was performed in the same way as in the room temperature testing and was evaluated according to the following scale.

◯: Introduction via the valve into the tire using the injector was easy;

Δ: Introduction was difficult;

x: Introduction was not possible.

For gelability, a time (in minutes) required for gelling to occur when 100 g of the puncture repair material were added to a predetermined amount of the gelling agent was measured and evaluated according to the following scale.

◯: Took 20 minutes or less to gel/Excellent gelability;

x: Took more than 20 minutes to gel/Insufficient gelability.

Results of the room temperature tests and the low temperature tests are shown in FIG. 2 (Examples 1 to 4 and Comparative examples 1 to 11) and FIG. 3 (Examples 5 to 11 and Comparative examples 12 to 15). The ingredients of the puncture repair material gelling agent and compounded amounts (unit: g) and added amounts (unit: g) thereof and the types and amounts (unit: g) of the puncture repair material along with the evaluations of injectability and gelability Note that in FIGS. 2 and 3, the compounds 1 to 9 in the ingredients of the gelling agent refer to the compounds 1 to 9 of Table 2 and the puncture repair materials 1 and 2 refer to the puncture repair materials 1 and 2 of Table 1, respectively. In FIG. 3, the antifreezing agents 1 and 2 refer to propylene glycol (manufactured by Adeka Corporation) and glycerin (manufactured by Wako Pure Chemical Industries, Ltd.), respectively.

Additionally, in FIGS. 2 and 3, the gelability time (min.) is an expression of time (unit: min.), and "60+" means "60 minutes or more."

4. Evaluation

Examples 1 to 4

During room temperature tests, the gelling agents used in Examples 1 to 4 were easily introduced, therefore injectability was evaluated as ◯, and gelled within 10 minutes, therefore gelability was evaluated as ◯.

Therefore, the gelling agents of Examples 1 to 4 solve problems described herein.

In summary, it is understood that when $R^1$ of the compound represented by the formula (5) is an alkenyl group with from 13 to 30 carbon atoms and $R^2$ of the compound represented by the formula (5) is a hydroxyethyl group, a gelling agent including the compound represented by the formula (5) solves problems described herein.

Examples 5 to 11

During the room temperature tests, the gelling agents including from 3 to 5 parts by mass of the antifreezing agent per 10 parts by mass of the compound represented by the formula (5) used in Examples 5 to 9 were easily introduced, therefore injectability was evaluated as ◯, and gelled within 10 minutes, therefore gelability was evaluated as ◯; and furthermore, during the low temperature tests were easily introduced, therefore injectability was evaluated as ◯, and gelled within 20 minutes, therefore gelability was evaluated as ◯.

Therefore, the gelling agents of Examples 5 to 9 solve problems described herein. Moreover, not only do they solve problems described herein, but they also display additional characteristics of excellent injectability and gelability at low temperatures.

On the other hand, during the low temperature test, the gelling agent including 2 parts by mass of the antifreezing agent per 10 parts by mass of the compound represented by the formula (5) used in Example 10 froze and was impossible to introduce, therefore injectability was evaluated as x. During the low temperature test, the gelling agent including 6 parts by mass of the antifreezing agent per 10 parts by mass of the compound represented by the formula (5) used in Example 11 was easily introduced, therefore injectability was evaluated as ◯, but gelling took 22 minutes, therefore gelability was evaluated as x.

Therefore, the gelling agents of Examples 10 and 11 solve problems described herein. However, unlike Examples 5 to 9, Examples 10 and 11 do not have sufficient injectability and gelability at low temperatures.

In summary, it is understood that gelling agents that include from 3 to 5 parts by mass of an antifreezing agent per 10 parts by mass of a compound represented by the formula (5) (in which $R^1$ is an alkenyl group with from 13 to 30 carbon atoms and $R^2$ is a hydroxyethyl group) have injectability and gelability even at low temperatures.

Comparative Examples 1 to 11

During the room temperature test, the gelling agents wherein a substituent $R^1$ of the compound represented by the formula (5) had 23 or 30 carbon atoms and a substituent $R^2$ of compound represented by the formula (5) was an ethyl group (compound 7 or 8) used in Comparative examples 4, 5, 9, and 10, were easily introduced, therefore injectability was evaluated as ○, but gelling took more than 10 minutes, therefore gelability was evaluated as x.

Therefore, the gelling agents of Comparative examples 4, 5, 9, and 10 do not solve some of the problems described herein.

During the room temperature test, the gelling agent wherein a substituent $R^1$ of the compound represented by the formula (5) had 33 carbon atoms and a substituent $R^2$ of the compound represented by the formula (5) was an ethyl group (compound 9) used in Comparative examples 6 and 11, had a wax-like consistency and was difficult to introduce, therefore injectability was evaluated as Δ, and gelling took more than 10 minutes, therefore gelability was evaluated as x.

Therefore, the gelling agents of Comparative examples 6 and 11 do not solve some of the problems described herein.

During the room temperature test, the gelling agents wherein a substituent $R^1$ of the compound represented by the formula (5) had 9 or 11 carbon atoms and a substituent $R^2$ of the compound represented by the formula (5) was an ethyl group or a hydroxyethyl group (compound 4, 5, or 6), used in Comparative examples 1 to 3, 7, and 8, were solids and impossible to introduce, therefore injectability was evaluated as x, and gelling took more than 10 minutes, therefore gelability was evaluated as x.

Therefore, the gelling agents of Comparative examples 1 to 3, 7 and 8 do not solve some of the problems described herein.

In other words, the gelling agents of Comparative examples 1 to 11 do not solve some of the problems described herein.

Comparative Examples 12 to 15

The gelling agents of Comparative examples 12 to 15 each include compounds 6 to 9, respectively, and an antifreezing agent.

The gelling agent used in Comparative example 12 included 10 parts by mass of the compound 6 and 15 parts by mass of the antifreezing agent, but both injectability and gelability were evaluated as x during the room temperature test. Furthermore, while injectability was evaluated as ○, gelling took more than 60 minutes so gelability was evaluated as x during the low temperature test.

The gelling agent used in Comparative example 13 included 10 parts by mass of the compound 7 and 15 parts by mass of the antifreezing agent. While injectability was evaluated as ○, gelling took more than 60 minutes so gelability was evaluated as x during the room temperature test. Furthermore, while injectability was evaluated as ○, gelling took more than 60 minutes so gelability was evaluated as x during the low temperature test.

The gelling agent used in Comparative example 14 included 10 parts by mass of the compound 8 and 15 parts by mass of the antifreezing agent. While injectability was evaluated as ○, gelling took more than 60 minutes so gelability was evaluated as x during the room temperature test. Furthermore, while injectability was evaluated as ○, gelling took more than 60 minutes so gelability was evaluated as x during the low temperature test.

The gelling agent used in Comparative example 15 included 10 parts by mass of the compound 9 and 15 parts by mass of the antifreezing agent. While injectability was evaluated as ○, gelling took more than 60 minutes so gelability was evaluated as x during the room temperature test. Furthermore, while injectability was evaluated as ○, gelling took more than 25 minutes so gelability was evaluated as x during the low temperature test.

Therefore, the gelling agents of Comparative examples 12 to 15 do not solve some of the problems described herein. Additionally, injectability and gelability at low temperatures is neither sufficient nor satisfactory.

In summary, it is understood that when the substituent $R^1$ of the compound represented by the formula (5) has from 13 to 30 carbon atoms and the substituent $R^2$ of the compound represented by the formula (5) is a hydroxyethyl group, gelling agents including the compound represented by the formula (5) (compound 1, 2, or 3) have satisfactory injectability and gelability and solve problems described herein (see Examples 1 to 11).

Additionally, it is understood that when the substituent $R^1$ of the compound represented by the formula (5) has from 13 to 30 carbon atoms and the substituent $R^2$ of the compound represented by the formula (5) is a hydroxyethyl group, gelling agents containing 3 to 5 parts by mass of an antifreezing agent per 10 parts by mass of the compound represented by the formula (5) have satisfactory injectability and gelability not only under a room temperature condition of 20° C., but also under a low temperature condition of −20° C. Therefore, along with solving problems described herein, they also display additional characteristics of excellent injectability and gelability at low temperatures (see Examples 5 to 9).

What is claimed is:

1. A puncture repair material gelling agent comprising a compound (α) of formula (1) and an antifreezing agent (β), said puncture repair material gelling agent comprising 50 mass % or more of the compound (α) and from 3 to 5 parts by mass of the antifreezing agent (β) per 10 parts by mass of the compound (α):

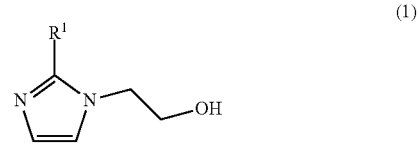

(1)

wherein $R^1$ is an alkyl group having from 13 to 30 carbon atoms or an alkenyl group having from 13 to 30 carbon atoms.

2. The puncture repair material gelling agent according to claim 1, wherein the antifreezing agent (β) is at least one type selected from the group consisting of propylene glycol, diethylene glycol, and glycerin.

3. The puncture repair material gelling agent according to claim 1, wherein the puncture repair material gelling agent is a liquid at 20° C. and gels the puncture repair material (D) at 20° C. within 10 minutes.

4. The puncture repair material gelling agent according to claim 1, wherein the puncture repair material gelling agent is a liquid at −20° C. and gels the puncture repair material (D) at −20° C. within 20 minutes.

5. The puncture repair material gelling agent according to claim 2, wherein the puncture repair material gelling agent is a liquid at 20° C. and gels the puncture repair material (D) at 20° C. within 10 minutes.

6. The puncture repair material gelling agent according to claim 3, wherein the puncture repair material gelling agent is a liquid at −20° C. and gels the puncture repair material (D) at −20° C. within 20 minutes.

7. The puncture repair material gelling agent according to claim 1, further comprising up to 50 mass % of a solvent additive.

8. The puncture repair material gelling agent according to claim 7, wherein the solvent additive comprises water.

9. A puncture repair material gelling agent comprising a compound (α) of formula (1) and an antifreezing agent (β), said puncture repair material gelling agent comprising 50 mass % or more of the compound (α):

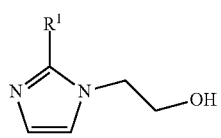
(1)

wherein $R^1$ is an alkyl group having from 13 to 30 carbon atoms or an alkenyl group having from 13 to 30 carbon atoms.

10. A puncture repair material gelling agent comprising a compound (α) of formula (1) and an antifreezing agent (β), said puncture repair material gelling agent comprising from 3 to 5 parts by mass of the antifreezing agent (β) per 10 parts by mass of the compound (α):

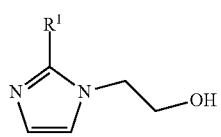
(1)

wherein $R^1$ is an alkyl group having from 13 to 30 carbon atoms or an alkenyl group having from 13 to 30 carbon atoms.

11. A puncture repair kit comprising: a puncture repair material (D) comprising a natural rubber latex (A), a resin emulsion (B), and an antifreezing agent (C), wherein a solid content of the natural rubber latex (A) is 30 mass % or more of a total of a rubber solid content and a resin solid content of the puncture repair material (D); and a puncture repair material gelling agent according to claim 1.

12. A puncture repair kit comprising: a puncture repair material (D) comprising a natural rubber latex (A), a resin emulsion (B), and an antifreezing agent (C), wherein a solid content of the natural rubber latex (A) is 30 mass % or more of a total of a rubber solid content and a resin solid content of the puncture repair material (D); and a puncture repair material gelling agent according to claim 9.

13. A puncture repair kit comprising: a puncture repair material (D) comprising a natural rubber latex (A), a resin emulsion (B), and an antifreezing agent (C), wherein a solid content of the natural rubber latex (A) is 30 mass % or more of a total of a rubber solid content and a resin solid content of the puncture repair material (D); and a puncture repair material gelling agent according to claim 10.

14. A method of use for the puncture repair material gelling agent according to claim 1, comprising:
introducing the puncture repair material gelling agent according to claim 1 into a pneumatic tire assembled on a rim that has undergone puncture repair by having a puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
mixing the puncture repair material (D) and the puncture repair material gelling agent; and
gelling the puncture repair material.

15. A method for recovering puncture repair material remaining in a tire comprising:
introducing a puncture repair material gelling agent according to claim 1 into a pneumatic tire assembled on a rim that has undergone puncture repair by having the puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
mixing the puncture repair material (D) and the puncture repair material gelling agent;
gelling the puncture repair material; and
recovering the gelled puncture repair material.

16. A method of use for the puncture repair material gelling agent according to claim 9, comprising:
introducing the puncture repair material gelling agent according to claim 9 into a pneumatic tire assembled on a rim that has undergone puncture repair by having a puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
mixing the puncture repair material (D) and the puncture repair material gelling agent; and
gelling the puncture repair material.

17. A method for recovering puncture repair material remaining in a tire comprising:
introducing a puncture repair material gelling agent according to claim 9 into a pneumatic tire assembled on a rim that has undergone puncture repair by having the puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
mixing the puncture repair material (D) and the puncture repair material gelling agent; gelling the puncture repair material; and
recovering the gelled puncture repair material.

18. A method of use for the puncture repair material gelling agent according to claim 10, comprising:
introducing the puncture repair material gelling agent according to claim 10 into a pneumatic tire assembled on a rim that has undergone puncture repair by having a puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
mixing the puncture repair material (D) and the puncture repair material gelling agent; and
gelling the puncture repair material.

19. A method for recovering puncture repair material remaining in a tire comprising:
- introducing a puncture repair material gelling agent according to claim 10 into a pneumatic tire assembled on a rim that has undergone puncture repair by having the puncture repair material (D) comprising a natural rubber latex (A), a resin emulsion (B), and the antifreezing agent (C), wherein a solid content of the natural rubber latex (A) is 30 mass % or more of a total of a rubber solid content and a resin solid content of the puncture repair material (D) introduced into the tire;
- mixing the puncture repair material (D) and the puncture repair material gelling agent; gelling the puncture repair material; and
- recovering the gelled puncture repair material.

* * * * *